US 6,574,589 B1

(12) United States Patent
Shoyama (10) Patent No.: US 6,574,589 B1
(45) Date of Patent: Jun. 3, 2003

(54) INFORMATION PROCESSING SYSTEM FOR SHARING INTERNAL AUXILIARY STORAGE DEVICE (75) Inventor: Takahiko Shoyama, Hadano (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/361,973

(22) Filed: Jul. 28, 1999

(30) Foreign Application Priority Data

Jul. 29, 1998 (JP) .......................... 10-214326

(51) Int. Cl.7 .................. G06F 9/455; G06F 13/12; G06F 13/38; G06F 12/00; G11B 5/09
(52) U.S. Cl. .................. 703/25; 703/23; 703/24; 360/48; 710/68; 710/74; 711/202; 711/206; 711/111
(58) Field of Search .................. 703/24, 25, 26, 703/23, 27; 710/62, 63, 64, 65, 68, 70, 74; 711/111, 112, 113, 114, 206, 147, 202; 360/48

(56) References Cited

U.S. PATENT DOCUMENTS

| 5,206,939 A | * | 4/1993 | Yanai et al. ........... 360/48 |
| 5,301,304 A | * | 4/1994 | Menon ................. 703/24 |
| 5,388,013 A | * | 2/1995 | Nakamura ............. 360/48 |
| 5,438,674 A | * | 8/1995 | Keele et al. ........... 703/23 |
| 5,455,926 A | * | 10/1995 | Keele et al. ........... 711/112 |
| 5,463,754 A | * | 10/1995 | Beausoleil et al. ..... 707/200 |
| 5,504,861 A | * | 4/1996 | Crockett et al. ....... 714/13 |
| 5,535,372 A | * | 7/1996 | Benhase et al. ........ 360/48 |
| 5,581,743 A | * | 12/1996 | Burton et al. .......... 703/26 |
| 5,588,140 A | * | 12/1996 | Misukanis et al. ...... 703/24 |
| 5,758,125 A | * | 5/1998 | Misinai et al. ......... 703/23 |
| 5,862,363 A | * | 1/1999 | Taroda et al. ......... 703/25 |
| 5,920,893 A | * | 7/1999 | Nakayama et al. ..... 360/48 |
| 5,951,691 A | * | 9/1999 | Ng et al. ............. 714/5 |
| 5,983,317 A | * | 11/1999 | Kanda et al. .......... 711/112 |
| 6,009,498 A | * | 12/1999 | Kumasawa et al. ..... 360/48 |
| 6,112,277 A | * | 8/2000 | Bui et al. ............ 360/48 |

FOREIGN PATENT DOCUMENTS

JP          6-150557         5/1994

* cited by examiner

Primary Examiner—Todd Ingberg
Assistant Examiner—W Thomson
(74) Attorney, Agent, or Firm—Mattingly, Stanger & Malur, P.C.

(57) ABSTRACT

An information processing system has first and second information processing apparatuses. The first information processing apparatus has an internal auxiliary storage device. The second information processing apparatus does not include an internal auxiliary storage device. Both information processing apparatuses have a main storage device, communication unit and auxiliary-storage-device control unit. The second information processing apparatus has an emulation mechanism for carrying out CKD-FBA format conversion to a series of CCW commands. Specifically, a command is set to access the internal auxiliary storage device and the emulation mechanism transmits the command set to the first information processing apparatus having the internal auxiliary storage device by way of the communication unit of the second information processing apparatus and a communication path.

5 Claims, 4 Drawing Sheets

INFORMATION PROCESSING SYSTEM FOR SHARING INTERNAL AUXILIARY STORAGE DEVICE

BACKGROUND OF THE INVENTION

The present invention relates to an input/output control system. More particularly, the present invention relates to an input/output control system suitable for an application in which accesses to an internal auxiliary storage device such as a disk unit embedded in an information processing apparatus are made by another information processing apparatus.

A general-purpose information processing system or the like normally employs a disk unit as an element of an auxiliary storage sub-system. Thus, the information processing system needs to carry out operations to input and output data from and to the disk unit.

Figure 4:
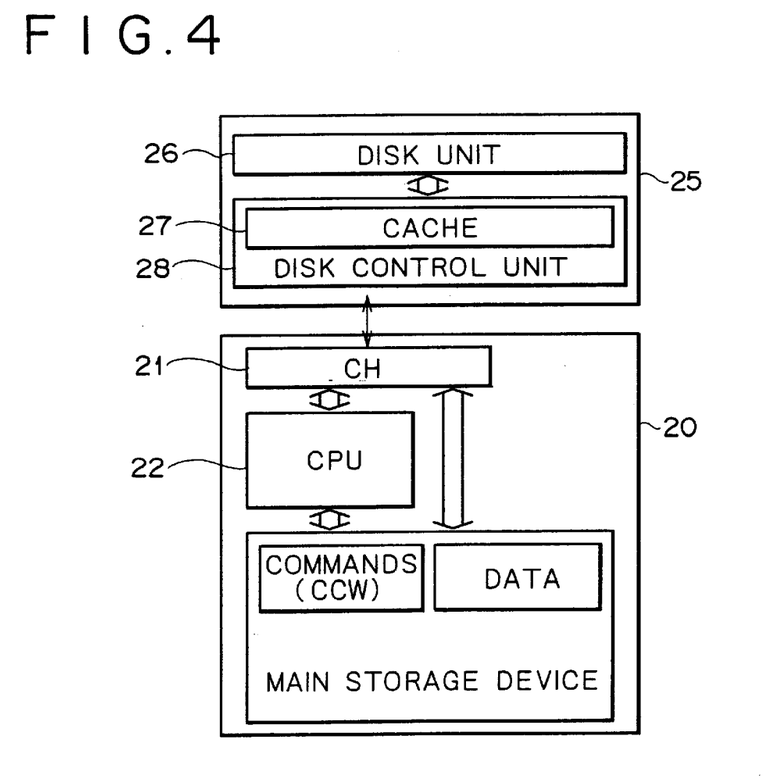
FIG. 4 is a block diagram showing a typical configuration of an information processing system including a disk unit based on the prior art.
Figure 5:
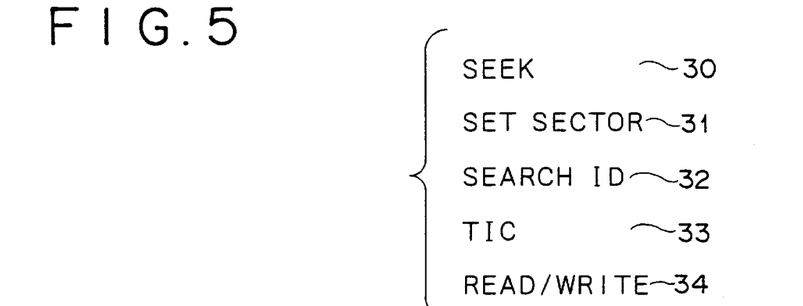
FIG. 5 is an explanatory diagram showing a typical series of channel commands used in the information processing system shown in FIG. 4.
Figure 6:
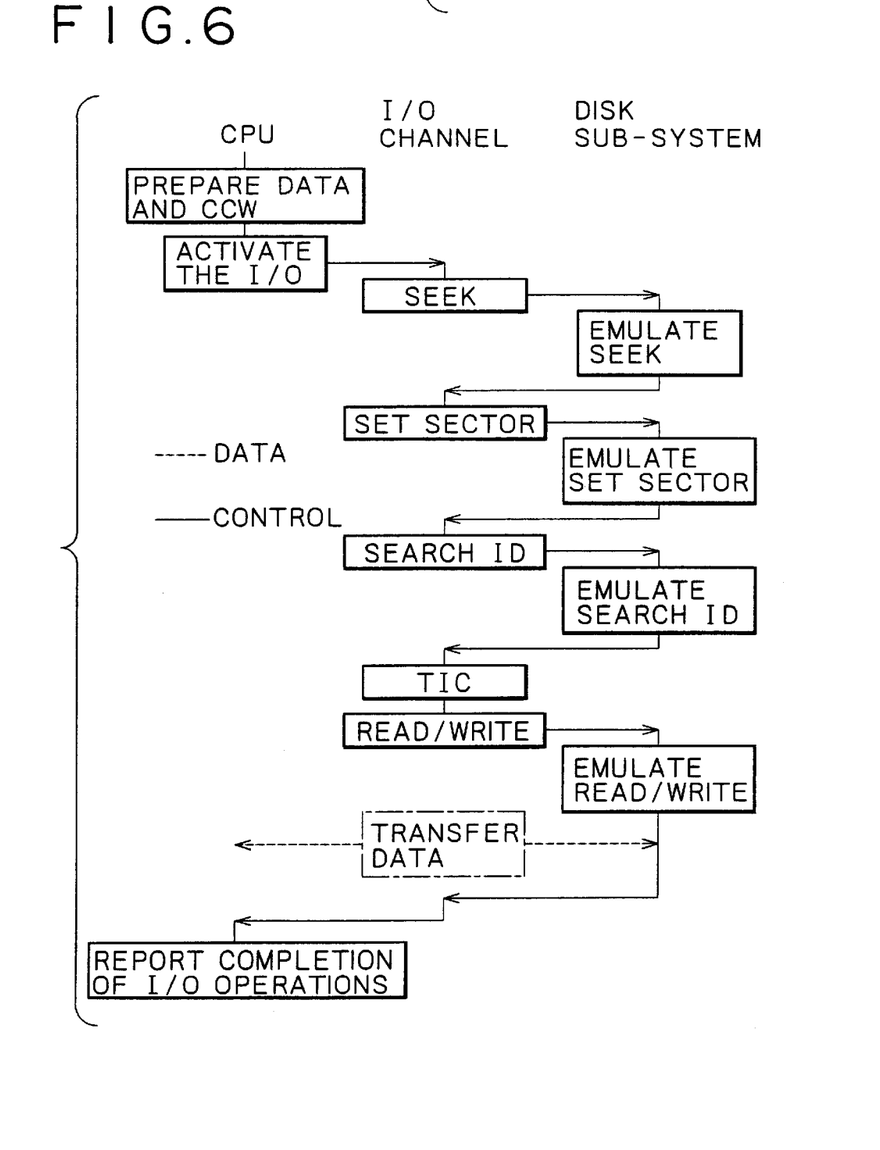
FIG. 6 is an explanatory diagram showing a typical flow of channel commands and data between an information processing apparatus and a disc sub-system employed in the information processing system shown in FIG. 4.

FIG. 4 is a block diagram showing a typical configuration of an information processing system employing a disk unit based on a prior art. FIG. 5 is an explanatory diagram showing an example of a series of channel commands and FIG. 6 is an explanatory diagram showing a typical flow of commands and data between an information processing apparatus and a disc sub-system. An input/output control system based on the prior art is explained by referring to FIGS. 4 to 6. In FIG. 4, reference numerals 20 and 21 denote an information processing apparatus and an input/output (I/O) channel. Reference numeral 22 denotes a central processing unit (CPU) and reference numeral 25 denotes a disc-subsystem. Reference numerals 26 and 27 denote a disk unit and a cache respectively. Reference numeral 28 denotes a disc control unit.

The information processing system based on the prior art as shown in FIG. 4 comprises the information processing apparatus 20 and the disc-subsystem 25. The information processing apparatus 20 includes a plurality of I/O channels 21 for controlling exchanges of information between the information processing apparatus 20 and external equipment such as the disc-subsystem 25. The I/O channels 21 are connected to the disc sub-system 25 which comprises a plurality of disk units 26 each having a fixed-length format (FBA format) and the disc control unit 28 including the cache 27. The disk units 26 operate under control executed by the disc control unit 28.

The I/O channel 21 issues a necessary command to the disc control unit 28 in order to make an access to data stored in the disk unit 26. The disc control unit 28 controls the disk units 26 in accordance with the command received from the I/O channel 21. This command is prepared by an operating system (OS) executed by the CPU 22 employed in the information processing apparatus 20 as a channel command word (CCW) for controlling data and the disk units 26.

Viewing the disk units 26 controlled by the disc control unit 28 as a storage unit for storing data with a variable-length format or a CKD (Count Key Data) format provided by a CKD architecture, an I/O channel 21 issues a request to input or output data with a CKD format to the disc control unit 28. The disc control unit 28 carries out command emulation including conversion of the CKD format into an FBA format.

It should be noted that a method to emulate a disk unit with the CKD format by using a disk unit with the FBA format is disclosed for example in Japanese Patent Laid-open No. Hei 6-150557.

The following description explains typical CCW commands issued by the information processing apparatus 20 to the disc sub-system 25 to exchange data with the CKD format as well as a flow of data and the CCW commands.

Normally, the CPU 22 issues a series of CCWs like ones shown in FIG. 5. The series of commands shown in FIG. 5 includes a SEEK command 30 for selecting a track by specifying a cylinder number and a head number. The series of commands also includes a SET SECTOR command 31 for positioning the head on a target sector indicated by a sector number specified in the command. Every track of a disk unit 26 is logically divided into sectors each having shape resembling a flap and an equal space.

The series of commands also includes a SEARCH ID command 32 for positioning the head on a target record. The target record can be confirmed by comparison of a record ID specified in the SEARCH ID command 32 with the record ID of a count read out from the disk unit 26. The series of commands also includes a TIC command 33. The TIC command 33 is a command for confirming that the target record has been found by the SEARCH ID command 32. The SEARCH ID command 32 and the TIC command 33 are executed repeatedly till the record desired by the SEARCH ID command 32 is found. The series of commands also includes a READ/WRITE command 34 for reading out or writing data from or into a record found by the series of preceding commands.

The following is a description of a flow of CCW commands output by the information processing apparatus 20 to the disc sub-system 25 following activation of an operation of the I/O function by the series of CCW commands prepared by the OS running on the information processing apparatus 20 with reference to FIG. 6.

The OS executed by the CPU 22 employed in the information processing apparatus 20 prepares the series of CCW commands for controlling data and a disk unit and stores the CCW commands in a main storage device. Then, the OS requests an I/O channel 21 to activate an operation of the I/O function for outputting the series of CCW commands to a disk unit 26. The operation of the disk unit 26 is then controlled by the disc control unit 28 in accordance with the series of the CCW commands. In this way, the CCW commands are sequentially transmitted by the CPU 22 to the disc control unit 28 by way of the I/O channel 21. To put it in detail, first of all, the I/O channel 21 reads out the SEEK command 30 from the main storage device and transmits the command to the disc control unit 28. As described earlier, the SEEK command 30 is placed at the head of the series of CCW commands stored in the main storage device. The I/O channel 21 then waits for an emulation of the SEEK command 30 to be completed by the disc control unit 28. The emulation includes a conversion of the SEEK command 30 from a CKD format into an FBA format. As the emulation is finished, the disc control unit 28 informs the I/O channel 21 of the completion.

Notified by the disc control unit 28 of the completion of the emulation, the I/O channel 21 transmits the next SET SECTOR command 31 to the disc control unit 28 on accordance with the same procedure as the preceding SEEK command 30. As described earlier, the SET SECTOR command 31 is a second command in the series of CCW commands. The I/O channel 21 then waits for the disc control unit 28 to transmit a notice reporting completion of processing of the SET SECTOR command 31. Receiving the notice, the I/O channel 21 repeats the same processing to transmit the SEARCH ID command 32 to the disc control unit 28 and waits for a notice of completion. The disc control unit 28 reports a notice of completion along with a result indicating a found record to the I/O channel 21.

Receiving the notice of completion from the disc control unit 28, the I/O channel 21 fetches the TIC command 33 from the main storage device. The TIC command 33 is executed by the I/O channel 21 to form a judgment as to whether or not the found record is a record desired by the SEARCH ID command 32. If the outcome of the judgment indicates that the found record is not the desired record, the I/O channel 21 retransmits the SEARCH ID command 32 to the disc control unit 28. This processing is carried out repeatedly till the found record matches the desired record. As the found record in the notice of completion matches the desired record specified in the SEARCH ID command 32, the I/O channel 21 fetches the READ/WRITE command 34 following the TIC command 33 from the main storage device and transmits the READ/WRITE command 34 to the disc control unit 28.

The I/O channel 21 waits for an emulation of the READ/WRITE command 34 including a conversion from a CKD format into an FBA format to be completed by the disc control unit 28.

The disc control unit 28 carries out the emulation of the READ/WRITE command 34, reading out or writing data from or into the disk unit 26. As the operation to read out or write data is completed, the disc control unit 28 informs the I/O channel 21 of the completion of the read/write operation. Notified by the disc control unit 28 of the completion of the read/write operation, the I/O channel 21 verifies that there is no more CCW command. Then, the I/O channel 21 informs the CPU 22 that the requested operation of the I/O function has been completed and ends the operation of the I/o function.

In the prior art described above, a disk unit is embedded in an information processing apparatus but sharing of the disk unit embedded in an information processing apparatus with another information processing apparatus is not taken into-consideration. Thus, if a plurality of other information processing apparatuses connected to the information processing apparatus including the embedded disk unit make accesses to the disk unit, the information processing apparatus having the embedded disk unit emulates the accesses, increasing the burden of an emulation mechanism employed in the apparatus having the disk unit.

In addition, in a system configuration wherein a plurality of information processing apparatuses each having a cache used in conjunction with an embedded disk unit employed in one of the information processing apparatuses as an internal auxiliary storage device are connected to an information processing apparatus having the embedded disk unit, the information processing apparatus having the embedded disk unit or one of the information processing apparatuses connected to the information processing apparatus having the embedded disk unit may update a piece of data stored in the embedded disk unit. In this case, since the other information processing apparatuses connected to the information processing apparatus having the embedded disk unit are not aware of the fact that the piece of data has been updated, in the cache for an internal auxiliary storage device in each of the other information processing apparatuses, a copy of the piece of data prior to the updating becomes obsolete but remains therein as it is. Thus, the copy of the piece of data prior to the updating stored in the cache no longer matches the updated piece of data stored in the embedded disk unit. As a result, there is raised a problem that a normal operation can not be assured due to the difference between the updated data stored in the embedded disk unit and a copy of the data stored in a cache.

SUMMARY OF THE INVENTION

It is thus an object of the present invention addressing the problem of the prior art described above to provide an input/output control system that allows an embedded disk unit of an information processing apparatus to be accessed by another information processing apparatus and is capable of assuring a normal operation.

In order to achieve the object described above, according to an aspect of the present invention, there is provided an input/output control system comprising a first information processing apparatus including a central processing unit, a main storage device and an internal auxiliary storage device, and one or a plurality of second information processing apparatuses each including a central processing unit, a main storage device and a communication unit for communicating with another information processing apparatus wherein any of said second information processing apparatuses makes an access to said internal auxiliary storage device of said first information processing apparatus, said first and second information processing apparatuses each comprising an auxiliary-storage-device control unit for controlling operations to read out and write information from and into said internal auxiliary storage device wherein said auxiliary-storage-device control unit of any of said second information processing apparatuses:

emulates an auxiliary storage format controlled by one command or a plurality of commands forming a series of commands stored in said main storage device employed by said secondary information processing apparatus employing said auxiliary-storage-device control unit in an auxiliary storage format executed by said auxiliary-storage-device control unit employed in said first information processing unit in order to make an access to said internal auxiliary storage device; and transmits a result of emulation to said first information processing apparatus by way of said communication unit employed by said secondary information processing apparatus employing said auxiliary-storage-device control unit.

In order to achieve the object described above, according to another aspect of the present invention, said first and second information processing apparatuses each have a cache for an internal auxiliary storage device and, when any of said first and second information processing apparatuses makes a request for an operation to update a piece of data stored in said internal auxiliary storage device or stored in said cache in said first information processing apparatus, said information processing apparatuses other than said information processing apparatus making said request are informed of said operation to update a piece of data or replacement data used for updating said piece of data.

In order to achieve the object described above, according to a further aspect of the present invention, communications between said first information processing apparatus and said second information processing apparatuses are divided into 2 types of communication with different protocols, namely, a communication to exchange control data for controlling said caches for said internal auxiliary storage device employed in said first information processing apparatus and a communication to read out and write data from and into said internal auxiliary storage device.

In order to achieve the object described above, according to a still further aspect of the present invention, said first information processing apparatus further has a table including:

a field for declaring an exclusive use of said internal auxiliary storage device employed in said first information processing apparatus;

a field for storing information indicating which of said information processing apparatuses is currently using said internal auxiliary storage device; and validity flags indicating whether or not contents of said fields are valid, wherein information stored in said table is used for identifying said information processing apparatuses to be informed of an operation to update a piece of data stored in said internal auxiliary storage device or stored in said cache in said first information processing apparatus or informed of replacement data used for updating said piece of data.

DESCRIPTION OF THE PREFERRED EMBODIMENTS

Preferred embodiments implementing an input/output control system provided by the present invention are explained in detail by referring to the accompanying diagrams.

Figure 1:
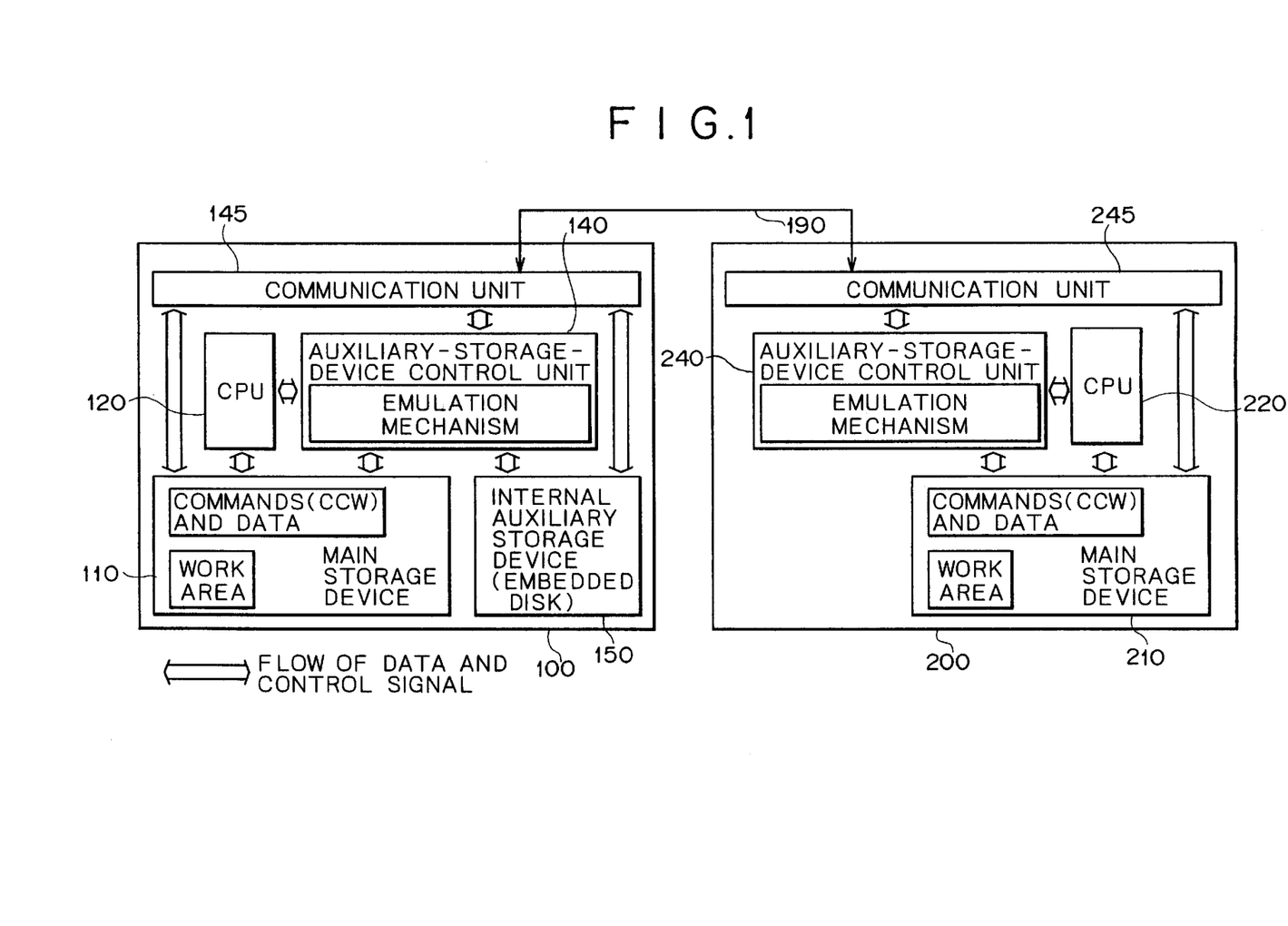
FIG. 1 is a block diagram showing a typical configuration of an information processing system adopting an input/output control system provided by a first embodiment of the present invention.

FIG. 1 is a block diagram showing a typical configuration of an information processing system adopting an input/output control system provided by a first embodiment of the present invention. In the figure, reference numerals 100 and 200 each denote an information processing apparatus whereas reference numerals 110 and 210 each denote a main storage device. Reference numerals 120 and 220 each denote a central processing unit (CPU) whereas reference numerals 140 and 240 each denote an auxiliary-storage-device control unit. Reference numerals 145 and 245 each denote a communication unit whereas reference numeral 150 denotes an internal auxiliary storage device (an embedded disk unit). Finally, reference numeral 190 denotes a communication bus.

In the information processing system shown in FIG. 1, the information processing apparatus 100 having the embedded disk unit 150 serving as an internal auxiliary storage device is connected to the information processing apparatus 200 having no embedded disk unit by the communication bus 190. The information processing apparatus 100 also has the CPU 120, the main storage device 110, the auxiliary-storage-device control unit 140 including an emulation mechanism for carrying out CKD-FBA format conversation and the communication unit 145 for controlling exchanges of information and data with another information processing apparatus. Similarly, the information processing apparatus 200 also has the CPU 220, the main storage device 210, the auxiliary-storage-device control unit 240 including an emulation mechanism for carrying out CKD-FBA format conversation and the communication unit 245 for controlling exchanges of information and data with another information processing apparatus. In the configuration shown in FIG. 1, the other information processing apparatus of the information processing apparatus 100 is the information processing apparatus 200, and the other information processing apparatus of the information processing apparatus 200 is the information processing apparatus 100.

The information processing apparatus 100 also includes the embedded disk unit 150 which is controlled by the auxiliary-storage-device control unit 140. The information processing apparatus 100 is connected to the information processing apparatus 200 by the communication bus 190 which serves as a transfer path for transferring control signals and data between the information processing apparatus 100 and the information processing apparatus 200 in an operation carried out by the information processing apparatus 200 to read out or write-data from or into the embedded disk unit 150.

The following description explains processing carried out by the information processing apparatus 200 to make an access to the embedded disk unit 150 employed in the information processing apparatus 100.

An OS executed by the CPU 220 prepares a series of CCW commands described in the CKD format in the main storage device 210. The OS also prepares data to be transferred to the embedded disk unit 150 in the main storage device 210 in case the access is made in an write operation. Used for controlling the embedded disk unit (the internal auxiliary storage device) 150, the CCW commands are the same as those explained earlier by referring to FIG. 5. The OS then requests the auxiliary-storage-device control unit 240 to start the operation of an I/O function. In this case, it is not necessary for the OS to specify which other information processing system is to be accessed since the information processing apparatus 100 is the only other information processing system that includes the embedded disk unit (the internal auxiliary storage device) 150. In actuality, it is the CPU 220 that issues a command to start the operation of the I/O function to the auxiliary-storage-device control unit 240. Receiving the command to start the operation of the I/O function, the auxiliary-storage-device control unit 240 starts an emulation of the series of CCW commands prepared by the OS.

First of all, the auxiliary-storage-device control unit 240 converts positional-address information specified in a SEEK command 30 and a SET SECTOR command 31 in the series of CCW commands described in the CKD format into positional-address information described in the FBA format. Then, the auxiliary-storage-device control unit 240 carries out an emulation of a SEARCH ID command 32 in the series of CCWs. Here, since a record ID specified in the SEARCH ID command 32 needs to be compared with the record ID of a count read out from the embedded disk unit 150 employed in the information processing apparatus 100 in order to confirm a target record, the auxiliary-storage-device control unit 240 issues a request for an operation to read out data from the embedded disk unit 150, transmitting the request to the embedded disk unit 150.

The request for an operation to read out data from the embedded disk unit 150 transmitted by the auxiliary-storage-device control unit 240 employed in the information processing apparatus 200 to the information processing apparatus 100 through the communication unit 245 and the communication bus 190 comprises a command to read out data issued as a command set that can be recognized by the embedded disk unit 150, the positional-address information in the FBA format obtained as a result of the emulation carried out earlier and the number of blocks representing the length of data to be readout, that is, the length of data up to the end of a track specified by the positional-address information.

The command set of the request for an operation to read out data from the embedded disk unit 150 transmitted to the information processing apparatus 100 is supplied to the embedded disk unit 150 by way of the communication unit 145 employed in the information processing apparatus 100. As requested by the command set, the embedded disk unit 150 transmits a response and the data to the information processing apparatus 200 by way of the communication unit 145 and the communication bus 190.

In the information processing apparatus 200, the data transmitted thereto is stored in a work area of the main storage device 210 by way of the communication unit 245. In addition, the communication unit 245 also informs the auxiliary-storage-device control unit 240 that a response has been received from the embedded disk unit 150 and that data read out from the embedded disk unit 150 has been stored in the main storage device 210. A positional address of a target count is determined from the positional-address information obtained as a result of the emulation and used to identify a count of the data read out from the embedded disk unit 150 and stored in the work area of the main storage device 210. Then, a count of the data identified in this way is compared with information on a record ID specified in the SEARCH ID command 32.

Subsequently, the auxiliary-storage-device control unit 240 carries out an emulation of a TIC command 33 of the series of CCW commands. To put it in detail, if the count of the data does not match the information on the record ID specified in the SEARCH ID command 32, the SEARCH ID command 32 is emulated again to obtain the count of a next record ID following the compared record ID and to compare the count with the information on the record ID specified in the SEARCH ID command 32. This emulation of the SEARCH ID command 32 is repeated till a count of the data matches the information on the record ID specified in the SEARCH ID command 32. As a count of the data matches the information on the record ID specified in the SEARCH ID command 32, the auxiliary-storage-device control unit 240 emulates a READ/WRITE command 34 in the series of CCW commands.

In the following description, the READ/WRITE command 34 in the series of CCW commands is exemplified by a WRITE command to write data with the CKD format into the embedded disk unit 150 employed in the information processing apparatus 100. The emulation of the WRITE command 34 writes the data which has been prepared by the OS of the information processing apparatus 200 into a data portion of a record including a count matching the information on the record ID in the comparison carried out by the SEARCH ID command 32. The data prepared by the OS has been stored in a work area in the main storage device 210 of the information processing apparatus 200.

In order to transfer the data stored in the work area of the information processing apparatus 200 to the embedded disk unit 150 employed in the information processing apparatus 100, in addition to the data to be transferred from the work area to the embedded disk unit 150, the auxiliary-storage-device control unit 240 employed in the information processing apparatus 200 also transmits a command requesting a write operation as a command set which can be recognized by the embedded disk unit 150, the positional-address information of the write operation in the FBA format obtained as a result of the emulation carried out earlier on the SEARCH ID command 32 and the length of the data to be transferred expressed in terms of blocks to the information processing apparatus 100 by way of the communication unit 245 and the communication bus 190.

The command set transmitted by the auxiliary-storage-device control unit 240 to request a write operation is supplied to the embedded disk unit 150 by way of the communication unit 145 employed in the information processing apparatus 100. The embedded disk unit 150 writes the data received from the auxiliary-storage-device control unit 240 thereto in accordance with the command set. Then, the embedded disk unit 150 reports completion of the write operation to the auxiliary-storage-device control unit 240 through the communication unit 145, the communication bus 190 and the communication unit 245. Notified of the completion of the write operation, the auxiliary-storage-device control unit 240 confirms that no command following the WRITE ID command 34 exists in the series of CCW commands, ending the series of operations of the I/O function. Finally, the auxiliary-storage-device control unit 240 informs the OS executed by the CPU 220 that the processing carried out on the series of operations of the I/O function has been completed.

As described above, according to the first embodiment of the present invention, an internal auxiliary storage device such as an embedded disk unit employed in an information processing apparatus can be shared by another information processing apparatus.

As described above, in the first embodiment of the present invention, the communication unit 145 is employed in the information processing apparatus 100. It should be noted that, if the embedded disk unit 150 which is used as an internal auxiliary storage device has its own communication function, the communication unit 145 is not required since the embedded disk unit 150 is capable of directly communicating with the communication unit 245 employed in the other information processing apparatus 200 through the communication bus 190. An example of a disk unit having a communication function is an SCSI disc.

As described above, the first embodiment of the present invention comprises one information processing apparatus 100 employing the embedded disk unit 150 as an internal auxiliary storage device and one information processing apparatus 200 sharing the embedded disk unit 150. It is worth noting, however, that the present invention allows a plurality of information processing apparatuses 200 to share the embedded disk unit 150 employed in the information processing apparatus 100 and to employ their own embedded disk units.

Figure 2:
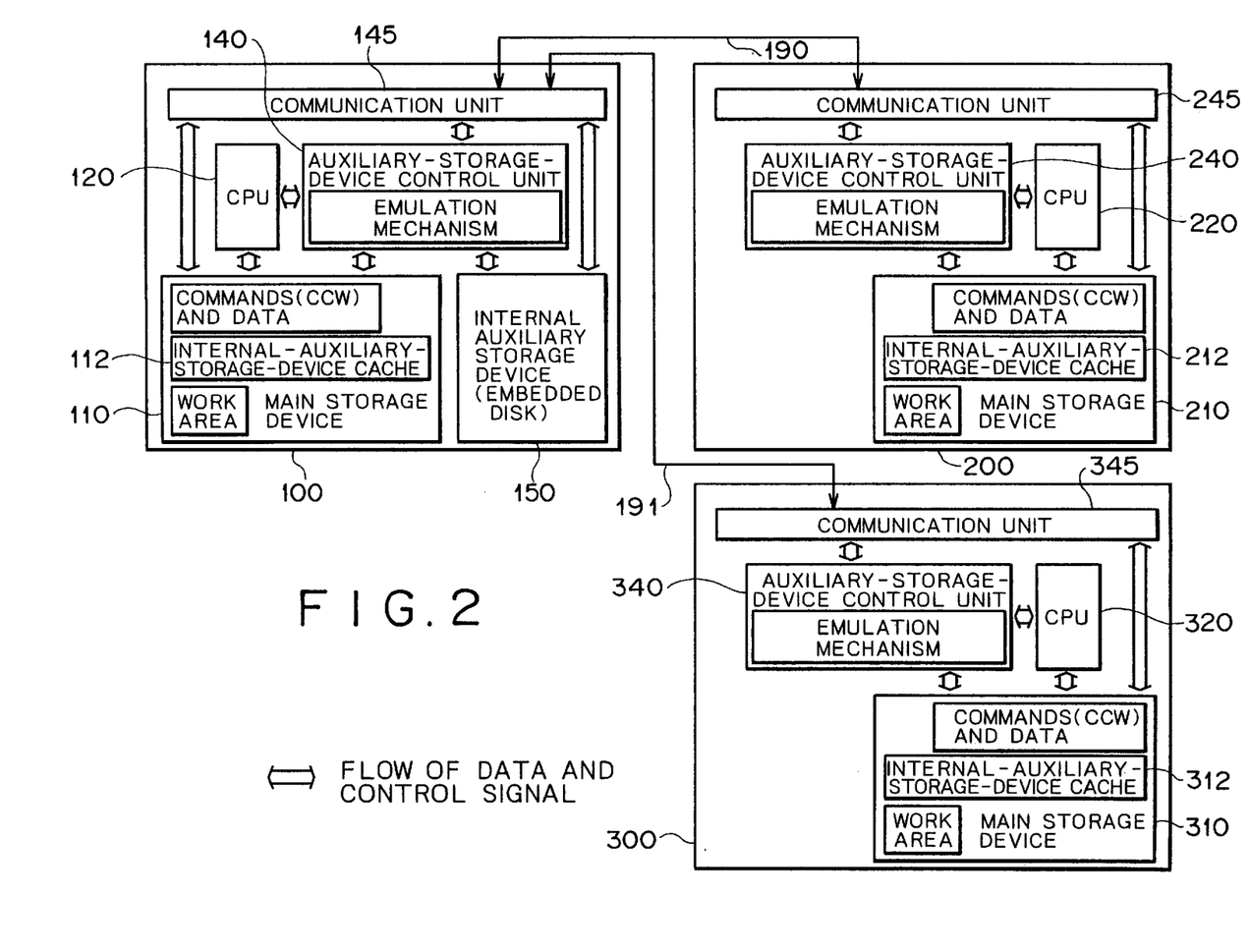
FIG. 2 is a block diagram showing a typical configuration of an information processing system adopting an input/output control system provided by a second embodiment of the present invention.
Figure 3:
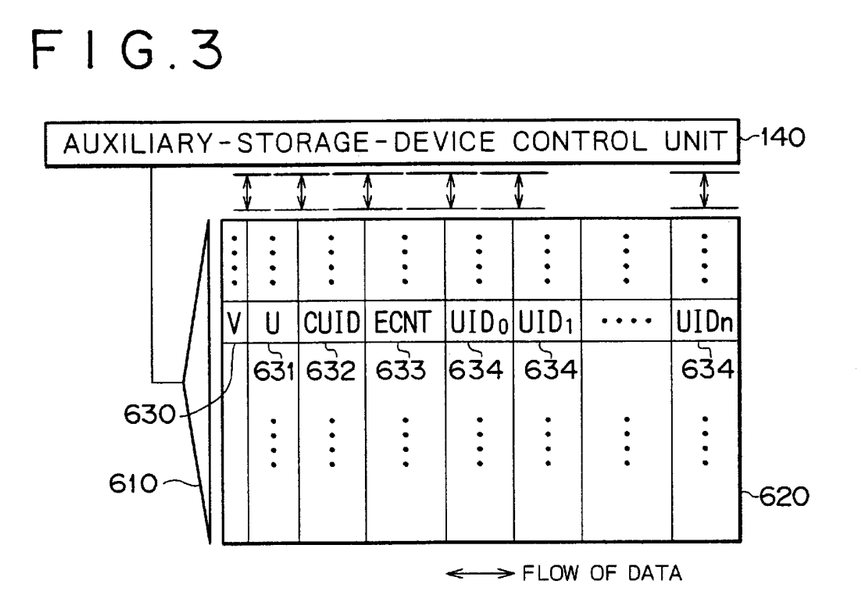
FIG. 3 is an explanatory diagram showing the structure of an internal-auxiliary-storage-device control table used for controlling exclusive use of an embedded disk unit shared by information processing apparatuses and assurance of data coherency among caches of the information processing apparatuses for the shared embedded disk unit (internal auxiliary storage device)

FIG. 2 is a block diagram showing a typical configuration of an information processing system adopting an input/output control system provided by a second embodiment of the present invention, and FIG. 3 is an explanatory diagram showing the structure of an internal-auxiliary-storage-device control table used for controlling exclusive use of the embedded disk unit shared by information processing apparatuses and assurance of data coherency among caches of the information processing apparatuses for the shared embedded disk unit (internal auxiliary storage device). In FIGS. 2 and 3, reference numeral 300 denotes another information processing apparatus whereas reference numerals 112, 212 and 312 in the information processing apparatuses 100, 200 and 300 respectively denote the caches for the shared internal auxiliary storage device 150. The information processing apparatus 300 comprises a main storage device 310, a central processing unit (CPU) 320, an auxiliary-storage-device control unit 340 and a communication unit 345. The information processing apparatus 300 is connected to the information processing apparatus 100 by a communication bus 191. Reference numerals 610 and 620 denote a select circuit and an internal-auxiliary-storage-device control table. The other reference numerals denote the same components as those shown in FIG. 1.

In comparison with the system shown in FIG. 1, in the system implemented by the second embodiment of the present invention as shown in FIG. 2, the information processing apparatus 300 is connected to the information processing apparatus 100 by the communication bus 191. In addition, the main storage devices 110, 210 and 310 of the information processing apparatuses 100, 200 and 300 respectively include the caches 112, 212 and 312 respectively which are provided for the internal auxiliary storage device 150 employed in information processing apparatus 100 so that the information processing apparatuses 200 and 300 are allowed to share the embedded disk unit 150.

The following description explains processing carried out by the information processing apparatus 200 to make an access to the embedded disk unit 150 employed in the information processing apparatus 100 in the system shown in FIG. 2.

Like the system shown in FIG. 1, receiving a command to start an operation of the I/O function from the CPU 220 of the information processing apparatus 200, the auxiliary-storage-device control unit 240 emulates the SEEK command 30 and the SET SECTOR command 31 of the series of CCW commands shown in FIG. 5. In an operation to read out data necessary for the emulation of the SEARCH ID command 32, first of all, the internal-auxiliary-storage-device cache 212 in the main storage device 210 is searched for the necessary data instead of searching the embedded disk unit 150 employed in the information processing apparatus 100.

If the necessary data exists in the internal-auxiliary-storage-device cache 212 at a location matching positional-address information specified in the SEEK command 30 and the SET SECTOR command 31, the auxiliary-storage-device control unit 240 compares information on a record ID specified in the SEARCH ID command 32 with a count in the necessary data existing in the internal-auxiliary-storage-device cache 212 in an emulation of a next TIC command 33. If the necessary data does not exist in the internal-auxiliary-storage-device cache 212 at a location matching the positional-address information, on the other hand, the auxiliary-storage-device control unit 240 transmits a command set requesting a read operation as explained earlier by referring to FIG. 1 to the communication unit 145 employed in the information processing apparatus 100 by way of the communication unit 245 and the communication bus 190. The communication unit 145 passes on the command set received from the communication unit 245 to the auxiliary-storage-device control unit 140.

The auxiliary-storage-device control unit 140 analyzes the command set received from the information processing apparatus 200 and searches the internal-auxiliary-storage-device cache 112 employed in the information processing apparatus 100 for the necessary data. If the necessary data exists in the internal-auxiliary-storage-device cache 112 at a location matching a read-data positional address specified in the command set, the auxiliary-storage-device control unit 140-reads out the necessary data and from the internal-auxiliary-storage-device cache 112 and transmits the data to the information processing apparatus 200 by way of the communication unit 145 and the communication bus 190.

If the necessary data does not exist in the internal-auxiliary-storage-device cache 112 at a location matching a read-data positional address specified in the command set, on the other hand, the auxiliary-storage-device control unit 140 passes on the command set requesting a read operation to the embedded disk unit 150. The embedded disk unit 150 reads out the necessary data therefrom in accordance with the command set and transmits the data to the information processing apparatus 200 by way of the communication unit 145 and the communication bus 190.

In the information processing apparatus 200, the necessary data received from the information processing apparatus 100 is passed on to the main storage device 210 by way of the communication unit 245 to be stored in the internal-auxiliary-storage-device cache 212. Then, the auxiliary-storage-device control unit 240 compares the information on the ID record specified in the SEARCH ID command 32 with a count in the data stored in the internal-auxiliary-storage-device cache 212 in an emulation of a next TIC command 33. As the SEARCH ID command 32 indicates that the ID record specified in the SEARCH ID command 32 matches a count in the necessary data, a WRITE/READ command 34 in the series of CCW commands is emulated.

Like the system shown in FIG. 1, in the following description, the READ/WRITE command 34 in the series of CCW commands is exemplified by a WRITE command to write data with the CKD format into the embedded disk unit 150 employed in the information processing apparatus 100.

The emulation of the WRITE command 34 writes the data which has been prepared by the OS executed by the CPU 220 of the information processing apparatus 200 into a data portion of a record including a count matching the information on the record ID in the comparison carried out by the SEARCH ID command 32. The data prepared by the OS has been stored in the internal-auxiliary-storage-device cache 212. In order to transfer the data stored in the internal-auxiliary-storage-device cache 212 to the embedded disk unit 150 employed in the information processing apparatus 100, in addition to the data to be transferred from the work area to the embedded disk unit 150, the auxiliary-storage-device control unit 240 employed in the information processing apparatus 200 also transmits a command requesting a write operation as a command set which can be recognized by the embedded disk unit 150, the positional-address information of the write operation in the FBA format obtained as a result of the emulation carried out earlier on the SEARCH ID command 32 and the length of the data to be transferred expressed in terms of blocks to the information processing apparatus 100 by way of the communication unit 245 and the communication bus 190.

The command set transmitted by the auxiliary-storage-device control unit 240 to request a write operation is supplied to the auxiliary-storage-device control unit 140 by way of the communication unit 145 employed in the information processing apparatus 100. The auxiliary-storage-device control unit 140 analyzes the command set received from the communication unit 145. Recognizing that the command set is a request for an operation to write data into the embedded disk unit 150, the auxiliary-storage-device control unit 140 informs the information processing apparatus 300 of the operation to write data over existing old data through the communication unit 145 and the communication bus 191 to notify the information processing apparatus 300 that the existing old data is no longer valid. To put it in detail, this notice informs the information processing apparatus 300 that the requested write operation invalidates the existing old data at a location matching the information on the write-data positional address specified in the command set received from the information processing apparatus 200. In the information processing apparatus 300, this notice is supplied to the auxiliary-storage-device control unit 340 by way of the communication unit 345.

The information processing apparatus 100 determines which other information processing apparatuses should be informed of the invalidation of the existing old data by referring to the internal-auxiliary-storage-device control table 620 stored in the main storage device 110 employed in the information processing apparatus 100 including the embedded disk unit 150. The internal-auxiliary-storage-device control table 620 shown in FIG. 3 is used for controlling identifiers of information processing apparatuses which make accesses to the embedded disk unit 150. Identifiers of information processing apparatuses which make accesses to the embedded disk unit 150 are provided in the internal-auxiliary-storage-device control table 620 as information on the system configuration.

Informed that existing old data is invalidated, the auxiliary-storage-device control unit 340 employed in the information processing apparatus 300 searches the internal-auxiliary-storage-device cache 312 for a copy of the existing old data. If a copy of the existing old data is stored in the internal-auxiliary-storage-device cache 312, the copy is made obsolete After notifying the information processing apparatus 300 that the existing old data will be invalidated, the auxiliary-storage-device control unit 140 searches the internal-auxiliary-storage-device cache 112 for a location matching the information on the write-data positional address specified in the command set. If such a location is found cataloged in the internal-auxiliary-storage-device cache 112, that is, if a copy of the existing old data is found stored in the internal-auxiliary-storage-device cache 112, new data specified by the WRITE command 34 is written over the copy of the existing old data stored in the internal-auxiliary-storage-device cache 112. If a location matching the information on the write-data positional address specified in the command set is not cataloged in the internal-auxiliary-storage-device cache 112, that is, if a copy of the existing old data is not stored in the internal-auxiliary-storage-device cache 112, on the other hand, the auxiliary-storage-device control unit 140 passes on the command set requesting a write operation to the embedded disk unit 150.

The embedded disk unit 150 stores the data therein in accordance with the command set and informs the auxiliary-storage-device control unit 140 of the completion of the operation to write the data. In turns, the auxiliary-storage-device control unit 140 notifies the auxiliary-storage-device control unit 240 employed in the information processing apparatus 200 of the completion of the write operation through the communication unit 145, the communication bus 190 and the communication unit 245. Notified of the completion of the write operation, the auxiliary-storage-device control unit 240 confirms that no command following the WRITE ID command 34 exists in the series of CCW commands, ending the series of operations of the I/O function. Finally, the auxiliary-storage-device control unit 240 informs the OS executed by the CPU 220 that the processing carried out on the series of operations of the I/O function has been completed.

In the processing described above, the auxiliary-storage-device control unit 140 employed in the information processing apparatus 100 analyzes the command set received from the communication unit 145 and, recognizing that the command set is a request for an operation to write data into the embedded disk unit 150, the auxiliary-storage-device control unit 140 informs the information processing apparatus 300 of the operation to write data over existing old data through the communication unit 145 and the communication bus 191 to notify the information processing apparatus 300 that the existing old data is no longer valid. Furthermore, the new data generated by the information processing apparatus 200 can also be transmitted to the auxiliary-storage-device control unit 340 employed in the information processing apparatus 300 to replace the old data existing in the internal-auxiliary-storage-device cache 312 or the new data is just newly stored in the internal-auxiliary-storage-device cache 312 in case such old data does not exist in the internal-auxiliary-storage-device cache 312. In this way, most recent data is held in the internal-auxiliary-storage-device cache 312.

In addition, when the information processing apparatus 100 replaces data stored in the embedded disk unit 150 or in the internal-auxiliary-storage-device cache 112 with new data, likewise, a notice of the invalidation of the existing old data or the new data is transmitted to the information processing apparatuses 200 and 300. As a result, it is possible to assure data coherency among the internal-auxiliary-storage-device caches 112, 212 and 312.

As described above, according to the second embodiment, internal-auxiliary-storage-device caches are used so that data can be transferred at a high speed.

As described above, in the second embodiment, the information processing apparatus 100 employing the embedded disk unit 150 is connected to the information processing apparatuses 200 and 300 by respectively the communication buses 190 and 191 which each serve as a transfer path for transferring signals to control read and write operations, signals to control cache coherency and data read out from and data to be written into the embedded disk unit 150. It should be noted, however, that the transfer path can be divided into a control communication bus and a data transfer bus. The control communication bus serves as a control-signal transferring path for transferring signals to control read and write operations and signals to control cache coherency. On the other hand, the data transfer bus serves as a data transfer path for transferring data read out from and data to be written into the embedded disk unit 150. In this way, the auxiliary-storage-device control units 240 and 340 employed in the information processing apparatuses 200 and 300 respectively are capable of utilizing the control communication bus and the data transfer bus properly. In addition, different communication protocols can be adopted for the control communication bus and the data transfer bus.

The following description explains the internal-auxiliary-storage-device control table 620 which is used by the information processing apparatus 100 to report invalidation of existing old data to other information processing apparatuses in detail by referring to FIG. 3.

The internal-auxiliary-storage-device control table 620 is a table used for executing exclusive control and control of data coherency among internal-auxiliary-storage-device caches 112, 212 and 312 in the second embodiment of the present invention wherein the embedded disk unit 150 is shared among the information processing apparatus 100 and the other information processing apparatuses 200 and 300. The embedded disk unit 150 employed in the second embodiment shown in FIG. 2 is divided into logical volumes which are each used as 1 or a plurality of processing units. The internal-auxiliary-storage-device control table 620 comprises as many entries as the logical volumes constituting the embedded disk unit 150 and the entries are identified by the same logical-volume numbers as the logical volumes.

Each of the entries of the internal-auxiliary-storage-device control table 620 includes: a validity-flag field V 630 for indicating whether data recorded in the entry is valid or invalid; an in-use flag field U 631 for indicating whether a logical volume corresponding to the entry is used or unused; an occupying-information-processing-apparatus-identifier field CUID 632 for identifying the present user and its attributes; a valid-information-processing-apparatus-count field ECNT 633 for controlling the number of information processing apparatuses making accesses to the embedded disk unit 150; and information-processing-apparatus-identifier fields UIDn 634 each for identifying an information processing apparatus making accesses to the embedded disk unit 150 and its attributes.

It should be noted that, as described earlier, the attributes include a path group, information indicating the existence or nonexistence of a cache and information indicating the existence or nonexistence of an emulation mechanism.

If there is only one information processing apparatus making accesses to the embedded disk unit 150, the identifier of this information processing apparatus is cataloged in the UID0 field 634. If there are two information processing apparatuses making accesses to the embedded disk unit 150, the identifiers of these information processing apparatuses are cataloged in the UID0 and UID1 fields 634. In this way, the identifiers of information processing apparatuses making accesses to the embedded disk unit 150 are catalogs in as many UIDn fields as the information processing apparatuses.

The auxiliary-storage-device control unit 140 controls the select circuit 610 for selecting an entry in the internal-auxiliary-storage-device control table 620 and carries out operations to read out and write data from and into the internal-auxiliary-storage-device control table 620.

At a system-initialization phase, pieces of configuration information are cataloged into the validity-flag field V 630, the valid-information-processing-apparatus-count field ECNT 633 for controlling the number of information processing apparatuses making accesses to the embedded disk unit 150 and the information-processing-apparatus-identifier fields UIDn 634 of the internal-auxiliary-storage-device control table 620. The information processing apparatuses making accesses to the embedded disk unit 150 can be changed by dynamically updating information stored in the internal-auxiliary-storage-device control table 620.

In the second embodiment of the present invention shown in FIG. 2, when the information processing apparatus 200 makes an access to the embedded disk unit 150 employed in the information processing apparatus 100, it is normally necessary for the information processing apparatus 200 to occupy a logical volume in the embedded disk unit 150 being accessed during a period of time between the start of an emulation of the first command in the series of CCWs and the end of an emulation of the last command in the series of CCWs. For this reason, the auxiliary-storage-device control unit 240 receiving a request to start the operation of the I/O function from the CPU 220 in the information processing apparatus 200 requests the auxiliary-storage-device control unit 140 employed in the information processing apparatus 100 to reserve the logical volume to be accessed.

Receiving the request to reserve the logical volume, the auxiliary-storage-device control unit 140 requests the select circuit 610 of the internal-auxiliary-storage-device control table 620 to select an entry identified by the number of the logical volume to be reserved. The auxiliary-storage-device control unit 140 confirms that the selected entry is valid by referring to the validity-flag field V 630 of the entry, that is, confirms that the logical volume which is to be reserved and associated with the selected entry exists in the embedded disk unit 150. Then, the auxiliary-storage-device control unit 140 determines whether the logical volume is usable or not by checking the in-use-flag field U 631 in the entry. If the logical volume is found usable, the information stored in the in-use-flag field U 631 in the entry is changed to 'being-used'. In addition, the auxiliary-storage-device control unit 140 stores the identifier of the information processing apparatus 200 into the occupying-information-processing-apparatus-identifier field CUID 632. Then, the auxiliary-storage-device control unit 140 reports a result of the request to reserve the logical volume to the information processing apparatus 200.

The report enables the auxiliary-storage-device control unit 240 employed in the information processing apparatus 200 to confirm the reservation of the logical volume. Emulation of a series CCW commands described earlier is then started by the second embodiment of the present invention. In the emulation of a write command, the auxiliary-storage-device control unit 240 stores new data into the internal-auxiliary-storage-device cache 212 and requests the auxiliary-storage-device control unit 140 employed in the information processing apparatus 100 to update data into the embedded disk unit 150.

Receiving the request to update data, the auxiliary-storage-device control unit 140 stores data in the embedded disk unit 150 as described in the explanation of the second embodiment and requests the select circuit 610 to select an entry in the internal-auxiliary-storage-device control table 620 identified by the number of the updated logical volume. Then, the auxiliary-storage-device control unit 140 informs information processing apparatuses cataloged in all the information-processing-apparatus-identifier fields UIDn 634 of the selected entry that a piece of existing data has been updated. Informed of the data updating, the information processing apparatuses each search its internal-auxiliary-storage-device cache for the existing old data and invalidates the existing old data, if found.

The auxiliary-storage-device control unit 240 employed in the information processing apparatus 200 confirms that there is no more command in the series of CCWs before transmitting a request to release the occupied logical volume to the auxiliary-storage-device control unit 140 employed in the information processing apparatus 100. Receiving the request to release the occupied logical volume, the auxiliary-storage-device control unit 140 drives the select circuit 610 to select an entry in the internal-auxiliary-storage-device control table 620 identified by the number of the occupied logical volume. The auxiliary-storage-device control unit 140 then changes the in-use-flag field U 631 to 'usable' and reports a result of the request to release the occupied logical volume to the information processing apparatus 200. Receiving the result of the request to release the occupied logical volume, the auxiliary-storage-device control unit 240 employed in the information processing apparatus 200 confirms the release of the occupied logical volume. As described above, the occupied logical volume is release by changing the contents of the in-use-flag field U 631 in the selected entry of the internal-auxiliary-storage-device control table 620 from 'being-used' to 'useable'. The auxiliary-storage-device control unit 240 notifies the CPU 220 that the operation of the I/O function has been completed and terminates the operation of the I/O function.

According to the above description, new replacement data to be written into the embedded disk unit 150 employed in the information processing apparatus 100 is transferred from the auxiliary-storage-device control unit 240 employed in the information processing apparatus 200 to the auxiliary-storage-device control unit 140 employed in the information processing apparatus 100. It should be noted, however, that in this present invention, an address showing an entry in the internal-auxiliary-storage-device cache 212 to be updated and a request for invalidation of the entry can be transmitted to the auxiliary-storage-device control unit 140 before the new replacement data to be stored in the embedded disk unit 150 and to be copied to the internal-auxiliary-storage-device cache 212 is transmitted to the information processing apparatus 100 by way of the communication unit 245, the communication bus 190 and the communication unit 145 to be directly stored into the embedded disk unit 150.

According to the methods described above, the auxiliary-storage-device control unit 240 employed in the information processing apparatus 200 is capable of directly reading out data from the embedded disk unit 150 employed in the information processing apparatus 100 through the communication unit 245, the communication bus 190 and the communication unit 145 without using the auxiliary-storage-device control unit 140 in a data read operation.

In the first and second embodiments described above, there is only one information processing apparatus employing an internal auxiliary storage device, and other information processing apparatuses including no internal auxiliary storage device make accesses to the internal auxiliary storage device. It should be noted, however, that the present invention also allows the other information processing apparatuses making accesses to the internal auxiliary storage device to each have its own internal auxiliary storage device.

According to the embodiments of the present invention described above, an emulation mechanism for allowing another information processing apparatus to make an access to the embedded disk unit employed in a specific information processing apparatus as an internal auxiliary storage device is provided in the other information processing apparatus making accesses to the embedded disk unit employed in the specific information processing apparatus for emulating commands issued by the other information processing apparatus. Thus, the embedded disk unit employed in the specific information processing apparatus as an internal auxiliary storage device can be shared with the other information processing apparatus.

In addition, according to the embodiments of the present invention described above, if each information processing apparatus has an internal-auxiliary-storage-device cache, the information processing apparatus employing the internal auxiliary storage device is provided with a cache-rewrite informing mechanism so that, only valid data is stored in the internal-auxiliary-storage-device cache of each information processing apparatus making accesses to the internal auxiliary storage device. As a result, data can be accessed at a high speed through the use of the internal-auxiliary-storage-device caches and, at the same time, data coherency is assured.

As described above, according to the present invention, a disk unit embedded in an information processing apparatus as an internal auxiliary storage device can be accessed at a high speed by other information processing apparatuses. In addition, normal operations are assured also in a system configuration with each information processing apparatus having an internal-auxiliary-storage-device cache.

What is claimed is:

1. An information processing system for sharing internal auxiliary storage device, comprising:

a first information processing apparatus including an internal auxiliary storage device having FBA format and a main storage device, said first information processing apparatus comprising:
 a first communication unit for communicating with another information processing apparatus and a first auxiliary-storage-device control unit for controlling operations to read out and write information from and into said internal auxiliary storage device;

a second information processing apparatus not including an internal auxiliary storage device and including a main storage device, said second information processing apparatus comprising:
 a second communication unit for communicating with said first information processing apparatus and a second auxiliary-storage-device control unit for controlling operations to read out and write information from and into said internal auxiliary storage device; and a communication path between said first communication unit in said first information processing apparatus and said second communication unit in said second information processing apparatus, wherein said second auxiliary-storage-device control unit in said second information processing apparatus comprises:
 an emulation mechanism for carrying out CKD-FBA format conversion to a series of CCW commands stored in said main storage device employed by said second information processing apparatus, generating a command set to make an access to said internal auxiliary storage device in said first information processing apparatus, and transmitting said command set to said first information processing apparatus by way of said second communication unit and said communication path.

2. An input/output control system according to claim 1 wherein said first information processing apparatus includes a cache for said internal auxiliary storage device and, when said second information processing apparatus makes a request for an operation to update a piece of data stored in said internal auxiliary storage device or stored in said cache in said first information processing apparatus, said first information processing apparatusis informed of said operation to update the piece of data or is informed of replacement data used for updating the piece of data.

3. An input/output control system according to claim 2 wherein communications between said first information processing apparatus and said second information processing apparatusis divided into two types of communication with different protocols; namely, a communication to exchange control data for controlling said caches for said internal auxiliary storage device employed in said first information processing apparatus; and a communication to read out and write data from and into said internal auxiliary storage device.

4. An input/output control system according to claim 2 wherein said first information processing apparatus further has a table including:
- a field for declaring an exclusive use of said internal auxiliary storage device employed in said first information processing apparatus;
- a field for storing information indicating which of said information processing apparatuses is using said internal auxiliary storage device; and
- validity flags indicating whether or not contents of said fields are valid.

5. An input/output control system according to claim 4 wherein said table further includes information stored in said table that is used for identifying said information processing apparatus to be informed of an operation to replace a piece of data stored in said internal auxiliary storage device or stored in said cache in said first information processing apparatus or to be informed of replacement data used for replacing said piece of data.

* * * * *